US011216704B2

(12) United States Patent
Couse et al.

(10) Patent No.: US 11,216,704 B2
(45) Date of Patent: Jan. 4, 2022

(54) RECOGNITION SYSTEM USING MULTIMODALITY DATASET

(71) Applicant: SPXTRM HEALTH INC., Toronto (CA)

(72) Inventors: John M. Couse, Toronto (CA); Eman M. Nejad, Oshawa (CA); Jason B. Couse, Toronto (CA)

(73) Assignees: John M. Couse;, Toronto (CA); Eman M. Nejad:, Oshawa (CA); Jason B. Couse, Etobicoke (CA)

( * ) Notice: Subject to any disclaimer, the term of this patent is extended or adjusted under 35 U.S.C. 154(b) by 85 days.

(21) Appl. No.: 16/661,258

(22) Filed: Oct. 23, 2019

(65) Prior Publication Data

US 2020/0125902 A1 Apr. 23, 2020

Related U.S. Application Data

(60) Provisional application No. 62/749,513, filed on Oct. 23, 2018.

(51) Int. Cl.
*G06K 9/62* (2006.01)
*G06T 7/246* (2017.01)
(Continued)

(52) U.S. Cl.
CPC ....... *G06K 9/6289* (2013.01); *G06K 9/00342* (2013.01); *G06K 9/00744* (2013.01);
(Continued)

(58) Field of Classification Search
CPC .................. G06N 3/006; G06T 11/206; G06K 9/00335–00355
See application file for complete search history.

(56) References Cited

U.S. PATENT DOCUMENTS

| 6,788,802 B2 | 9/2004 | Chiba et al. |
| 8,406,506 B2 | 3/2013 | Nishigaki |

(Continued)

FOREIGN PATENT DOCUMENTS

| CN | 104036301 A | 9/2014 |
| CN | 107993255 A | 5/2018 |

(Continued)

OTHER PUBLICATIONS

Baskaran, Savitha, Shiaofen Fang, and Shenhui Jiang. "Spatiotemporal visualization of traffic paths using color space time curve." 2017 IEEE International Conference on Big Data (Big Data). IEEE, 2017. (Year: 2017).*

(Continued)

*Primary Examiner* — Ryan McCulley
(74) *Attorney, Agent, or Firm* — Norton Rose Fulbright Canada LLP

(57) ABSTRACT

A computer system extracts motion features from a video recording of a real-world event, captured from a video recording device, to generate a motion capture dataset, the motion capture dataset including human models of human motion; generates a synthetic dataset based on derivatives of the motion capture dataset; generates an augmented motion capture dataset based on modified conditions of the motion capture dataset; generates an augmented synthetic dataset based on modified conditions of the synthetic dataset; and generates a multimodality dataset based on a combination of the motion capture dataset, the synthetic dataset, the augmented motion capture dataset, and the augmented synthetic dataset.

20 Claims, 11 Drawing Sheets

(51) Int. Cl.
    *G06N 3/08* (2006.01)
    *G06N 3/04* (2006.01)
    *G06K 9/00* (2006.01)
    *G06T 11/20* (2006.01)
(52) U.S. Cl.
    CPC ............. *G06K 9/6256* (2013.01); *G06N 3/04* (2013.01); *G06N 3/08* (2013.01); *G06T 7/246* (2017.01); *G06T 11/206* (2013.01); *G06T 2207/10016* (2013.01); *G06T 2207/20081* (2013.01); *G06T 2207/30196* (2013.01)

(56) References Cited

U.S. PATENT DOCUMENTS

| | | | |
|---|---|---|---|
| 10,332,261 | B1 | 6/2019 | Farivar et al. |
| 2016/0151052 | A1* | 6/2016 | Balwani .................. A61B 5/746 600/562 |
| 2018/0271460 | A1 | 9/2018 | Geiger et al. |
| 2019/0205667 | A1 | 7/2019 | Avidan et al. |

FOREIGN PATENT DOCUMENTS

| | | |
|---|---|---|
| EP | 2737436 A1 | 6/2015 |
| WO | 2018184187 A1 | 10/2018 |
| WO | 2018187632 A1 | 10/2018 |
| WO | 2018219931 A1 | 12/2018 |
| WO | 2019147693 A1 | 8/2019 |

OTHER PUBLICATIONS

De Souza 12, César Roberto, et al. "Procedural generation of videos to train deep action recognition networks." (2017). (Year: 2017).*

Effenberg, Alfred, et al. "Motionlab sonify: A framework for the sonification of human motion data." Ninth International Conference on Information Visualisation (IV'05). IEEE, 2005. (Year: 2005).*

Ihaddadene, Nacim, and Chabane Djeraba. "Real-time crowd motion analysis." 2008 19th International Conference on Pattern Recognition. IEEE, 2008. (Year: 2008).*

Mayer, Nikolaus, et al. "What makes good synthetic training data for learning disparity and optical flow estimation?." International Journal of Computer Vision 126.9 (2018): 942-960. (Year: 2018).*

Orekondy, Tribhuvanesh, Mario Fritz, and Bernt Schiele. "Connecting pixels to privacy and utility: Automatic redaction of private information in images." Proceedings of the IEEE Conference on Computer Vision and Pattern Recognition. 2018. (Year: 2018).*

N. Kumaran et al. Multiple Action Recognition for Human Object with Motion Video Sequence using the Properties of HSV Color Space Applying with Region of Interest International Journal of Innovative Technology and Exploring Engineering (IJITEE) ISSN: 2278-3075, vol. 8 Issue-6, Apr. 2019.

Detection and Localization of Motorway Overhead Directional Signs by Convolutional Neural Networks Trained With Synthetic Images, Year: 2019.

LeagueAI: Improving object detector performance and flexibility through automatically generated training data and domain randomization, Year: 2019.

Auvinet, Edouard et al., Multiple cameras fall data set, Technical Report 1350, DIRO—University of Montreal, Jul. 8, 2010, 24 pages.

Hochreiter, Sepp et al., Long Short-Term Memory, Neural Computation 9, pp. 1735-1780, 1997 Massachusetts Institute of Technology, Communicated by Ronald Williams.

Ilg, Eddy et al., FlowNet 2.0: Evolution of Optical Flow Estimation with Deep Networks, Proceedings of the IEEE conference on computer vision and pattern recognition, 2017, pp. 2462-2470.

Simonyan, Karen et al., Very Deep Convolutional Networks for Large-Scale Image Recognition, ICLR 2015, Apr. 10, 2015, 14 pages.

* cited by examiner

| | 115 | 116 | 117 | 118 | 119 | 120 |
|---|---|---|---|---|---|---|
| 114 | PIXEL NUM | PIXEL VALUE | MUSICAL NOTE | DURATION OF NOTE | TONE VALUE | VOLUME OF NOTE |
| | P1 | 670 | B- | 32 | - | 2 |
| | P2 | 760 | A | 8 | + | 5 |
| | P3 | 1500 | D | 16 | - | 6 |
| | P4 | 1728 | E- | 64 | - | 8 |
| | P5 | 276 | E | 1 | + | 9 |
| | P6 | 726 | G | 4 | + | 2 |
| | P7 | 1628 | F+ | 8 | - | 4 |
| | P8 | 926 | G | 1 | + | 3 |

FIG. 8B

RECOGNITION SYSTEM USING MULTIMODALITY DATASET

CROSS-REFERENCE TO RELATED APPLICATIONS

This application claims benefit and priority from U.S. Provisional Patent Application No. 62/749,513 filed on Oct. 23, 2018, the contents of which are incorporated by reference herein.

FIELD

This relates to using motion capture to create datasets that model human actions and behaviours, and in particular, using such datasets in machine learning systems.

BACKGROUND

There is a wealth of video and audio datasets of recorded and modeled human action. These datasets have become available through the cataloging of video and audio sources in film and online, such as social media sources, and may be used, for example, as training sets, for developing computer vision and machine learning algorithms.

With the advent of faster and more efficient parallel processing processors, for example, graphics processing units (GPUs) or tensor processing units (TPUs) and the emergence of deep learning algorithms and techniques, these vast video and audio datasets may now be analyzed to develop recognition systems to identify and model attributes, such as human actions, in a recorded event. Such recognition systems may have application, for example, in retail settings, airports, and parking lots to monitor individuals' behavior and public safety.

A further application of recognition systems is in the field of health care. For example, in a healthcare environment it may be desirable to identify specific actions such as falls, excessive washroom time, aggression, night time sleep quality, wound management monitoring, attempted suicide, patient abuse, or elder abuse. However, such events may be in private settings, for example, in a patient examination room, hospital room or private room in a residential care home, where sensitive activities take place.

SUMMARY

A computer-implemented method for generating a multimodality dataset, comprising: extracting motion features from a video recording of a real-world event, captured from a video recording device, to generate a motion capture dataset, the motion capture dataset including human models of human motion; generating a synthetic dataset based on derivatives of the motion capture dataset; generating an augmented motion capture dataset based on modified conditions of the motion capture dataset; generating an augmented synthetic dataset based on modified conditions of the synthetic dataset; and generating a multimodality dataset based on a combination of the motion capture dataset, the synthetic dataset, the augmented motion capture dataset, and the augmented synthetic dataset.

In some embodiments, the derivatives include at least one of shape, height and sex of the human models.

In some embodiments, the modified conditions include at least one of orientation, location, scale and brightness.

In some embodiments, the method further comprises filtering and rendering at least one of the motion capture dataset, the synthetic dataset, the augmented motion capture dataset, and the augmented synthetic dataset to form a colourized heatmap representing vectors and velocities.

In some embodiments, the colourized heatmap is a hue saturation value representation.

In some embodiments, the vectors and velocities represent vectors and velocities of human actions and inanimate object movements.

In some embodiments, the method further comprises converting at least one of the motion capture dataset, the synthetic dataset, the augmented motion capture dataset, and the augmented synthetic dataset into a music or sound notation to form an audio saturation value representation.

In some embodiments, the real-world event is simulated.

In some embodiments, the multimodality dataset is for use in training a machine learning algorithm.

In some embodiments, the machine learning algorithm is a motion recognition deep learning algorithm for predicting actions based on a video input.

According to another aspect, there is provided a computer system comprising: a processor; a memory in communication with the processor, the memory storing instructions that, when executed by the processor cause the processor to perform a method as described herein.

According to another aspect, there is provided an electronic device for machine learning motion recognition, comprising a processor and memory storing code to configure the processor to: at a training phase, extract motion features from event data to generate a motion capture dataset; generate a synthetic dataset based on the motion capture dataset; generate an augmented fully redacted multimodality dataset based on a combination of the motion capture dataset and the synthetic dataset; using deep learning, build a recognition model using the generated datasets; at a prediction phase, receive features of additional event data; process the features using the recognition models to generate predicted motion data; generate alert data based on the generated predicted motion data; and transmit the alert data to a reporting device.

In some embodiments, the processor is further configured to: convert the motion capture dataset to a heatmap of vectors and velocities of human actions and inanimate object movements.

In some embodiments, the processor is further configured to: convert the synthetic dataset to a heatmap of vectors and velocities of human actions and inanimate object movements.

Other features will become apparent from the drawings in conjunction with the following description.

BRIEF DESCRIPTION OF DRAWINGS

In the figures which illustrate example embodiments,

FIG. 8B depicts a table of values and musical characteristics assigned to pixels, according to an embodiment;

DETAILED DESCRIPTION

Building robust recognition systems depends upon access to audio and video data that may not be readily available in the context of healthcare, due to the sensitive nature of the conditions and privacy concerns.

For many healthcare interactions, such as those taking place in a patient examination room, hospital room or private room in a residential care home, video and audio surveillance is not currently prevalent. In the event that video and audio recordings have taken place, these recordings are often only held for a short period of time and offline, and are therefore are not available for developing machine learning datasets.

Another drawback of audio and video recording in a sensitive personal environment is that there may be a heightened expectation of privacy and security of data collected in such an environment. However, even with security measures in place such as locked down video cameras and networks using static IP addresses, username and password protection, custom CODECs, and HTTPS, there are still other security threats, such as through social engineering, that may provide unauthorized access to the data and images, so a robust non-reversible image or audio redaction technique is required.

In order to obtain audio and video data in conditions or environments in which live data may be difficult to acquire, such as a healthcare setting, actors may roleplay scripted scenes to simulate events with specific attributes common to healthcare interactions, which can be recorded to form datasets. This may require scripted actors to repeatedly perform uncomfortable and compromising actions against or with another actor. Furthermore, to obtain a sufficient amount of data, events may need to be roleplayed hundreds or thousands of times with a number of variations, which may be time-consuming and difficult to obtain.

As such, audio and video data of events in certain conditions and environments (such as healthcare settings), either acquired live or simulated, may not provide enough of the requisite actions nor enough variation of actions (for example, from different viewing perspectives) to provide sufficient data to develop effective deep learning models.

Figure 1:
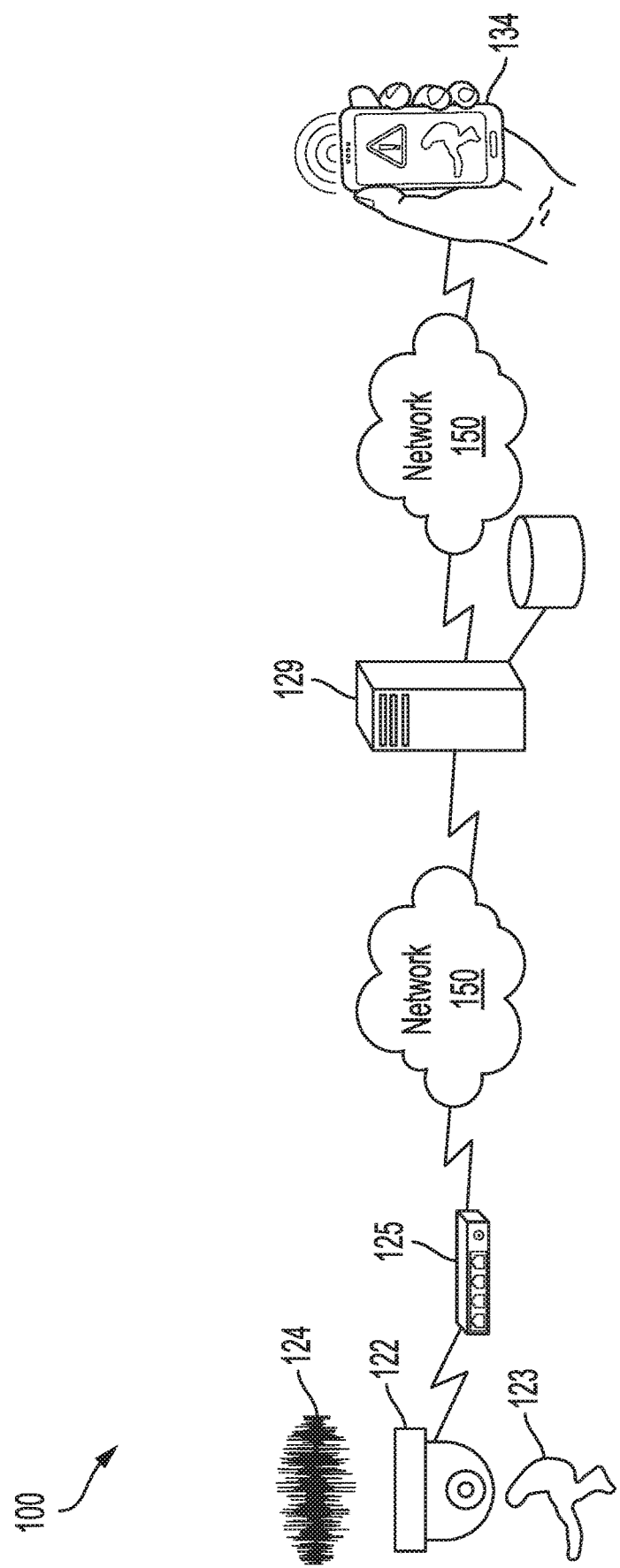
FIG. 1 is a schematic diagram of an operating environment of an example embodiment of a recognition system.

FIG. 1 is a schematic block diagram illustrating an operating environment of an example embodiment of recognition system 100.

Recognition system 100 uses motion capture to obtain datasets, and creates synthetic video datasets to model difficult-to-obtain human actions and behaviors to use when developing computer vision and machine learning algorithms. Generated synthetic digital datasets may be combined with real-world video-based datasets and various other visual and audio-based representations of human actions and behaviors into a multimodality dataset.

As illustrated, a video source 122, illustrated by way of example as a camera, is in communication with a computing device 129 by way of a network 150. Network 150 may, for example, be a packet-switched network, in the form of a LAN, a WAN, the public Internet, a Virtual Private Network (VPN) or the like. Computing device 129 is also in communication with a reporting device 134 by way of network 140.

Capture device 122 is an audio, video or motion capture device or recording device used to record an event, for example, the movement of objects or people. Capture device 122 may be configured to capture audio and video, and moving or still images. In some embodiments, capture device 122 may be a computing device.

In some embodiments, capture device 122 may be a camera.

Capture device 122 may record video of a live event or a simulated event, for example, as performed by scripted actors.

Capture device 122 may also include sensors to record electronic proximity, structured light, LIDAR, laser or polarized light data related to an event. In some embodiments, capture device 122 may capture audio data only.

Capture device 122 may include built-in passive infrared (PIR) sensors or onboard video motion detection algorithms for motion detection, to trigger a capture of an event.

Recorded data captured from capture device 122 may be video data such as an MPEG 2 transport stream (MP2TS) or MPEG 4 transport stream (MP4TS).

Capture device 122 may have processing capabilities to transcode recorded video data into a suitable format and re-encapsulated. For example, a transport stream may be transcoded from MPEG 2 to MPEG 4 (H.264) if necessary, for example, for compression. Recorded data may also be encrypted using techniques such as AES 256 or Hyper Text Transfer Protocol Secure (HTTPS).

Capture device 122 may also classify recorded data into a particular category and the recorded data may then be converted to a redacted Hue Saturation Value (HSV) representation based on colorized heatmaps derived from a human or an inanimate object's movements representing vectors and velocities and/or a redacted Audio Saturation Value (ASV) representation, for example, using techniques described herein. In some embodiments, such a redacted HSV representation or a redacted ASV representation may be non-reversible engineered.

In some embodiments, a redacted HSV representation may not be reverse engineered, as source motion-detected video clips, such as recorded data captured by captured device 122, may start out as 4K or HD quality video frames that are first stripped of all background and human features such as hair, facial features and identifying clothes as well as any human body part that is not in motion. The resulting frames are then subjected to a redaction process to replace the pixels representing moving body parts with a representation of direction of movement, using one color to represent the four quadrants of right/left and up/down with a morphing of the colors as they transition from one quadrant to another. In another embodiment, the change in velocity of that moving pixel is also augmented with an additional color scheme to highlight the body parts that are accelerating as they change quadrants. Steps of the redaction process may delete data such as underlying pixels in real time with a resulting reduced pixels per frame, such as 100×100 pixels per frame, and in the form of an animated GIF, in an example, six to ten seconds. The redaction process, as described herein, may prevent a redacted HSV representation, such as a final GIF, from being reverse engineered, and thus may provide increased security and privacy.

Similarly, in the case of a redacted ASV representation, in some embodiments, source audio clips may be stripped of identifying personal features such as actual words and intonation and only parts of the audio file (such as a .wav file) which provide markers to analyze vocal behavior are retained and used, focusing on the non-verbal aspect of speech, such as a rapidly increasing number of words spoken and their increasing volume, which can be associated with anger escalation. Steps of the redaction process may delete data in real time, and a resulting aggression score, for example, on a scale between one and ten, would provide no meaningful data to perform reverse engineering on, and thus may provide increased security and privacy.

Recorded data may be transmitted from capture device 122 to computing device 129 over network 150. In some embodiments, recorded data may be sent through a switch or router 125 before reaching computing device 129.

In some embodiments, computing device 129 may receive recorded data from a source other than capture device 122. Recorded data may represent, for example, pre-recorded video data captured at an earlier time and location.

Computing device 129 may be a local server, a single remote server, a cloud-based computing system, a software as a service platform (SAAS platform), or any other suitable computing device.

Computing device 129, in response to receiving video data, may process the recorded data into datasets for use in training or testing a recognition deep learning algorithm, such as recognition deep learning algorithm 432, discussed in further detail below, and build out further datasets, using techniques described herein. Computing device 129 may also use recorded data in application of recognition deep learning algorithm 432 to, for example, perform motion recognition of the recorded data and generate associated alerts.

Computing device 129 may send results of recognition deep learning algorithm 432 or associated alerts to reporting device 134 over network 150.

Reporting device 134 may be a computing device such as a mobile device. Example mobile devices include without limitation, cellular phones, cellular smartphones, smartwatches, personal worn computing device, wireless organizers, pagers, personal digital assistants, computers, laptops, handheld wireless communication devices, headset wireless communication devices, wirelessly enabled notebook computers, portable gaming devices, tablet computers, or any other portable electronic device with processing and communication capabilities. In at least some embodiments, mobile devices as referred to herein can also include without limitation, peripheral devices such as displays, speakers, printers, touchscreens, projectors, digital watches, cameras, digital scanners and other types of auxiliary devices that may communicate with another computing device.

In one example, reporting device 134 may be a smartphone, as illustrated in FIG. 1. In another example, the computing device may be a touchscreen enabled device and the other a type of communication device (e.g., a router) for connecting to other devices. As will be apparent, other types of computing devices can be envisaged that benefit from interconnection and interoperability.

Reporting device 134 may include long-range or network communications component(s) and/or short-range network communications component(s) that provide the mobile device with various different voice and data communication functions. In some embodiments, short-range communications enabled by short-range or near-field communications component(s) may include Bluetooth, LoRa, or a near field communications (NFC) subsystem that may be utilized to communicate with an NFC reader.

Reporting device 134 may be configured to provide an alert notification or ringtone based on data received from computing device 129. Reporting device 134 may also receive and present HSV representation and ASV representation data from computing device 129.

Reporting device 134 may be configured to allow a user to play or replay data received from computing device 129, such as an ASV representation, and a user may interact with reporting device 134, for example, through voice recognized command on how a depicted situation should be handled through an associated application on reporting device 134.

Figure 2:
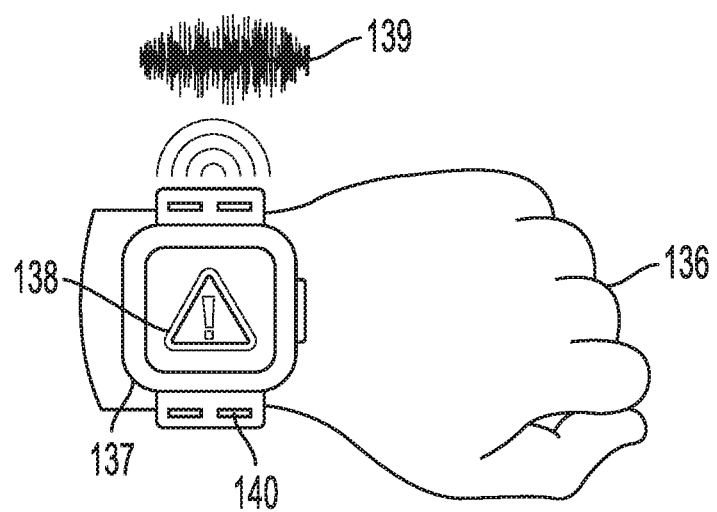
FIG. 2 is a schematic diagram of a reporting device, according to an embodiment.

In an example, reporting device 134 may be embodied as a smartwatch, such as smartwatch 137 illustrated in FIG. 2.

FIG. 2 depicts a healthcare worker 136 or guardian wearing smartwatch 137 that has received an alert 138 from computing device 129.

In an example, smartwatch 137, through a mobile alert application, elicits a ringtone 139 that is an ASV representation or HSV representation of a fall or any other aberrant action recognized by computing device 129.

In some embodiments, healthcare worker 136 may interact with the mobile alert application through voice commands by using an onboard microphone 140 of smartwatch 137.

Figure 3:
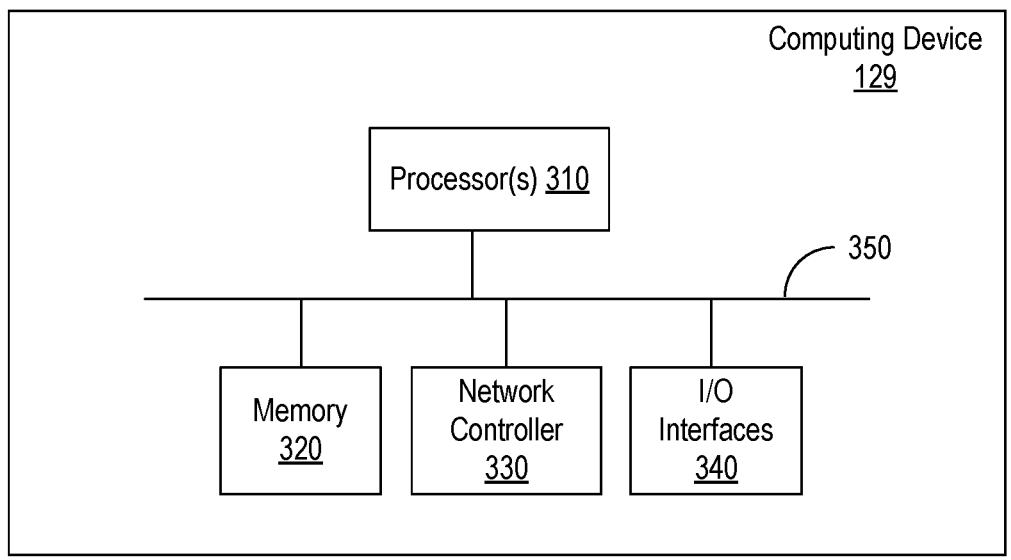
FIG. 3 is a high-level block diagram of a computing device of the recognition system of FIG. 1, according to an embodiment.

FIG. 3 is a simplified block diagram of computing device 129, according to an example embodiment. Computing device 129 includes a processor(s) 310, a memory 320, a network controller 330, and one or more I/O interfaces 340 in communication over bus 350.

Processor(s) 310 may be one or more Intel x86, Intel x64, AMD x86-64, PowerPC, ARM processors or the like.

Memory 320 may include random-access memory, read-only memory, or persistent storage such as a hard disk, a solid-state drive or the like. Read-only memory or persistent storage is a computer-readable medium. A computer-readable medium may be organized using a file system, controlled and administered by an operating system governing overall operation of the computing device.

Network controller 330 serves as a communication device to interconnect the computing device with one or more computer networks such as, for example, a local area network (LAN) or the Internet.

One or more I/O interfaces 340 may serve to interconnect the computing device with peripheral devices, such as for example, keyboards, mice, video displays, and the like. Optionally, network controller 330 may be accessed via the one or more I/O interfaces.

Software instructions are executed by processor(s) 310 from a computer-readable medium. For example, software may be loaded into random-access memory from persistent storage of memory 320 or from one or more devices via I/O interfaces 340 for execution by processor(s) 310. As another example, software may be loaded and executed by processor(s) 310 directly from read-only memory.

Figure 4:
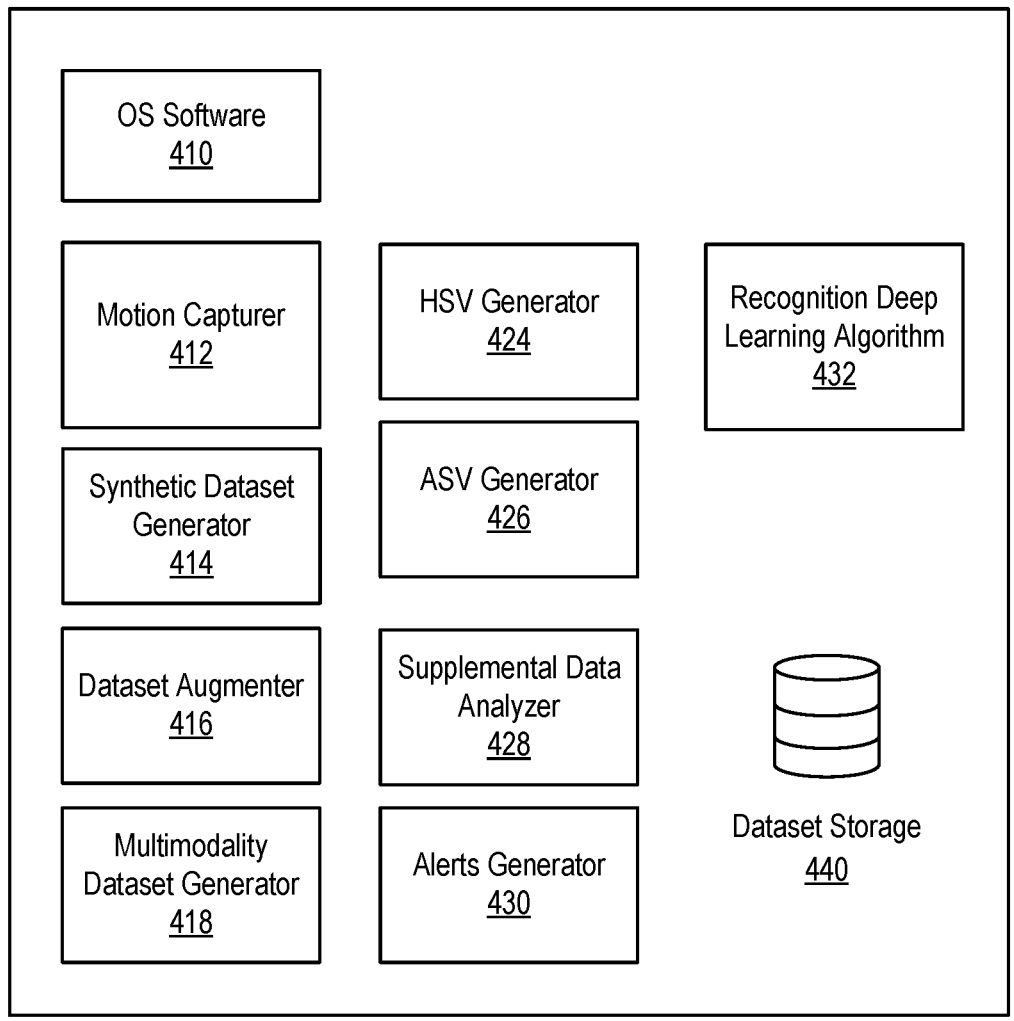
FIG. 4 illustrates the organization of software at the computing device of FIG. 3.

FIG. 4 depicts a simplified organization of example software components and data stored within memory 320 of computing device 129. As illustrated, these software components include operating system (OS) software 410, a motion capturer 412, for example, for live recordings, a synthetic dataset generator 414, for example, for simulated recordings, a dataset augmenter 416, a multimodality dataset generator 418, an HSV generator 424, an ASV generator 426, a supplemental data analyzer 428, an alert generator 430, a recognition deep learning algorithm 432, and a dataset storage 440.

Any or all of the software components described herein may be configured and executed on any computing device of capture device 122, computing device 129, or reporting device 134.

OS software 410 may be, for example, Microsoft Windows, UNIX, Linux, Mac OSX, or the like. Generally, OS software 410 is responsible for determining the functions and features available at computing device 129, such as keyboards, touch screen, synchronization with applications, email, text messaging and other communication features as will be envisaged by a person skilled in the art. OS software 410 allows software to access one or more processors 310, memory 320, network controller 330, and one or more I/O interfaces 340 of computing device 129.

Motion capturer 412 is configured to receive recorded data, such as video data, of a live event or a simulated event.

An event may be simulated, for example, by actors playing out scripted actions and scenes with inanimate and virtual objects, with other actors present or individuals such as actors interacting with themselves through VR headsets with scenes that were previously recorded.

Figure 5:
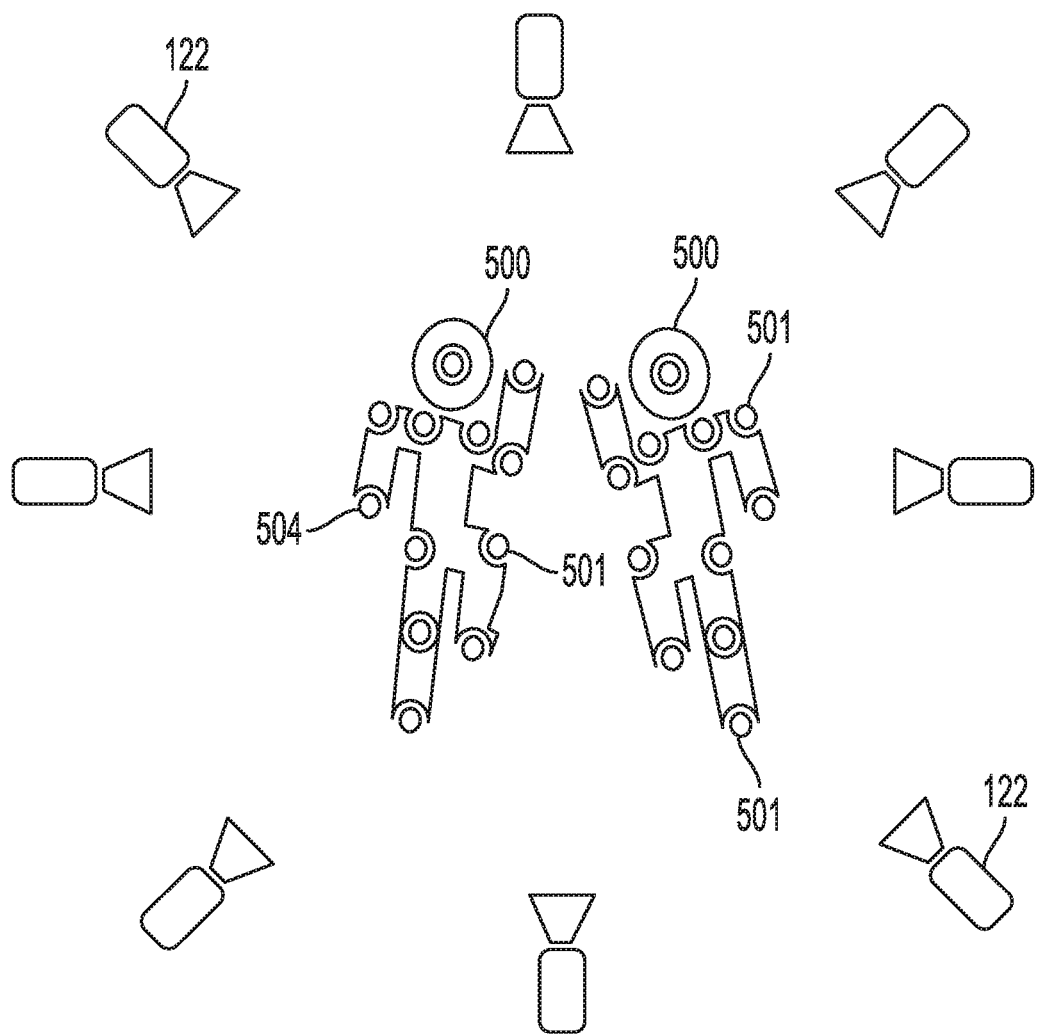
FIG. 5 is a schematic diagram of a simulated event, according to an embodiment.

FIG. 5 is a schematic diagram of a simulated event, according to an embodiment. FIG. 5 depicts two actors 500 playing characters based on a predefined script. Actors 500 are covered with motion capture tags 501 at strategic joint locations and are being recorded by multiple capture devices 122 such as infrared or other types of sensors such as structured light, lasers, or polarized light, or photogrammetry cameras to provide a number of perspectives.

The data recorded by capture devices 122 may form recorded data.

Motion capturer 412 is configured to process recorded data to generate motion capture datasets that represent human actions. In an example, motion capture datasets may be used to animate a digital character. Motion capture datasets may also be used as input for a recognition deep learning algorithm 432, for example, as training or testing data.

Motion capturer 412 may process recorded by recording patterns of movement digitally, for example, the recording of an individual's movement and facial expressions.

Those skilled in the art will appreciate that recorded data used to generate motion capture datasets may include data obtained from audio and video recordings, photogrammetry, electronic proximity sensors, structured light, LIDAR, laser or polarized light systems versus systems that use reflective markers on the joints of actors and face landmarks to record the movement and facial expressions of actors, or other suitable sensing and recording techniques.

Such motion capture datasets may be used when developing computer vision, machine learning or deep learning algorithms.

Figure 6:
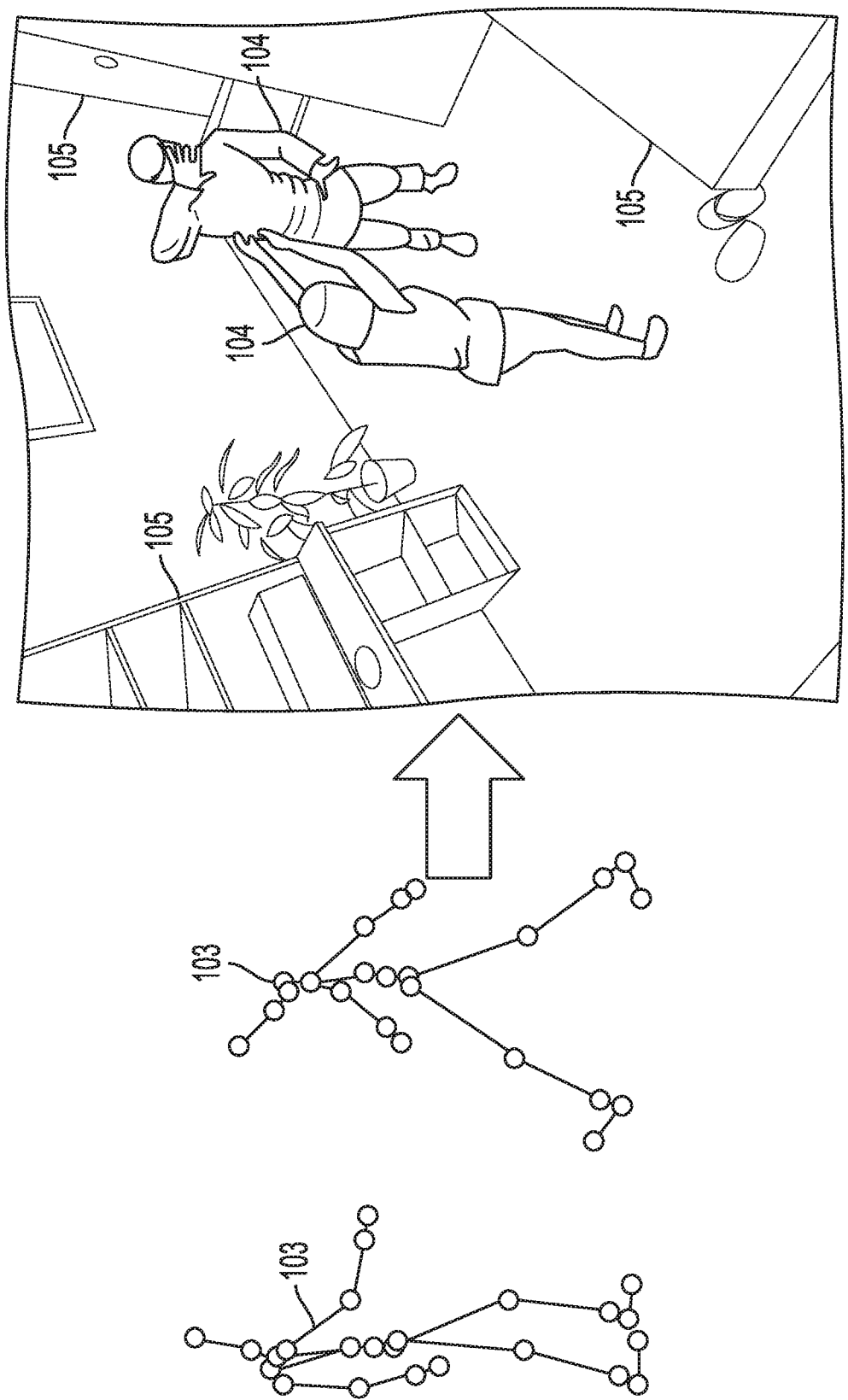
FIG. 6 illustrates example stick figure models and synthetic models, according to an embodiment.

Motion capture datasets may represent the event data, such as a human in a scene, mapped to a three-dimensional model, such as a stick model or skeleton model. An example of a motion capture dataset is illustrated in FIG. 6, in the form of stick figure models 103. Stick figure models 103 are generated by motion capturer 412 from a scene depicting violence between two people.

Data generated by motion capturer 412 may be stored in dataset storage 440.

Synthetic dataset generator 414 is configured to create, based on motion capture data from motion capturer 412, synthetic audio and/or video datasets to model human actions and behaviors. As used herein, "synthetic" may be defined as data that does not represent a real-world event.

Motion capture datasets, for example in the form of stick figure models 103, may be input to synthetic dataset generator 414. Synthetic dataset generator 414 may include an animation system, in which a stick figure model may be rendered into thousands of derivatives. Derivative variables include, for example, different skins (such as body shape, height and gender), different clothes (such as street clothes, pajamas, robes), facial expressions (such as angry, sad, happy), different image resolutions (such as 780P to 4K), different frame rates and camera angles (such as level, elevated, overhead), different human action speeds, different poses (such as by themselves, with other synthetic actors, replacing the inanimate object with another object or another synthetic actor that may have actually themselves been previously recorded), and combining different actions from multiple stick figure models into one composite synthetic character or isolating one synthetic action from a synthetic character.

FIG. 6 depicts synthetic models 104 generated by synthetic dataset generator 414 based on stick figure models 103. Synthetic models 104 may represent characters of different sex, age and clothing style. In the example shown in FIG. 6, a simulated room with attributes 105, such as walls, furniture and doors, has been generated to create a synthetic dataset.

As with motion capture datasets generated from recorded audio and/or video, the synthetic datasets generated by synthetic dataset generator 414 may be used as input for recognition deep learning algorithm 432, for example, as training or testing data.

In some embodiments, generated synthetic human actions and behaviors may be rendered, repurposed and augmented into thousands of instances to train machine learning systems, such as recognition deep learning algorithm 432, to accurately recognize abnormal and aberrant behaviors.

Data generated by synthetic dataset generator 414 may be stored in dataset storage 440.

Dataset augmenter 416 is configured to augment motion capture datasets or synthetic datasets. As an example, a synthetic action that is rendered and viewed in thousands of different angles/vantage points, may be expanded into additional datasets by using augmentation techniques.

In some embodiments, dataset augmenter 416 generates additional datasets through a variety of processing or combination of multiple processing techniques, such as random rotation, shifts, shear and flips of attributes in an event. Modified augmentation conditions may include at least one of orientation, location, scale and brightness.

Augmentation techniques may include mirror-imaging, zooming in and out, frame removal and recomposing, and tilting etc. Other techniques include the addition or removal of occlusions and the speeding up or the slowing down of parts of an action.

Data generated by dataset augmenter 416 may be stored in dataset storage 440.

Generating synthetic datasets and generating additional datasets using augmentation techniques, as described above may provide for a lower dataset production cost versus traditional video capture techniques and may also provide a larger dataset. A larger dataset may reduce overfitting that can occur in smaller datasets, since smaller datasets may allow for the inclusion of noise into a deep learning model that can in turn lead to more false positives in application, for example, in a production computer vision system.

Multimodality dataset generator 418 is configured to combine generated synthetic datasets with motion capture datasets generated by real-world video and a variety of other visual and audio-based representations of human actions and behaviors to generate a multimodality dataset.

The resulting hybrid multimodality dataset may be used by machine learning systems, for example, as input for recognition deep learning algorithm 432 as training or testing data.

Data generated by multimodality dataset generator 418 may be stored in dataset storage 440.

HSV generator 424 is configured to generate a Hue Saturation Value (HSV) representation by filtering and rendering data into colourized vectors and velocities heatmaps.

In some embodiments, HSV generator 424 may convert the video frames of recorded data received from capture device 122 using optical flow techniques to render the captured image into colorized vectors and velocities heatmaps derived from a human or an inanimate object's movement. In some embodiments, HSV generation removes background from an image of a video.

HSV generation by HSV generator 424 may be applied to live action, synthetic and augmented datasets to convert them into HSV representations for deep learning training, for example, of recognition deep learning algorithm 432. In some embodiments, HSV representation data may be decoded into motion data, for example, for deep learning training, for example, of recognition deep learning algorithm 432.

In some embodiments, HSV generation of data may be performed before the data is input to synthetic dataset c 414 for synthetic dataset generation. The resulting synthetic rendering of action datasets thus does not require any background rendering processing, which may in turn reduce synthetic dataset creation processing time and costs.

Post-processing of the redacted live action HSV representation requires less processing power as the video classifiers do not have to deal with background information in determining the action to be recognized.

Figure 7A:
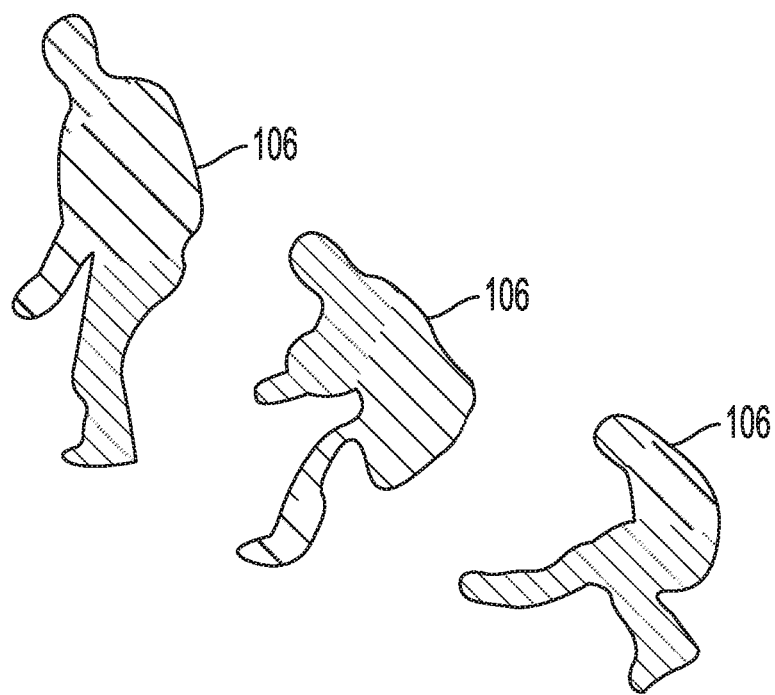
FIG. 7A depicts a Hue Saturation Value (HSV) representation of a human action, according to an embodiment.

FIG. 7A depicts a Hue Saturation Value (HSV) representation 106 of a human action, according to an embodiment. Hue Saturation Value (HSV) representation 106 depicts a person going through various states of falling.

Hue Saturation Value (HSV) representation 106 may be generated from video clips from synthetic, simulated and live action sources (such as motion capture data).

During the conversion of data to an HSV representation, backgrounds may be removed, and thus only synthetic characters (such as synthetic models 104) are rendered, instead of rendering an entire scene, which may save rendering processing time and costs.

Recorded data converted to an HSV representation may be in a form that may only be recognizable by the intended receiving onboard or downstream computer vision processing system, and thus, may be of little to no use to unauthorized access.

HSV representation may provide for a personal identification redaction supporting higher levels of privacy through all stages of processing, storage, and transmission of high-risk events. For example, the removal of background information may remove telltale clues that could lead to the identification of a patient through the identification of personal effects in their private room. HSV representation may thus address security and privacy of sensitive video frames during the live action capture, transit, processing, and storage stages performed by recognition system 100, and recognition system 100 may provide privacy and operational efficiencies.

Data generated by HSV generator 424 may be stored in dataset storage 440.

ASV generator 426 is configured to generate an Audio Saturation Value (ASV) representation by converting data, such as captured video frames, into a music or sound notation. In some embodiments, this technique encodes data using a codec having an encryption key known only to the system. Therefore, even if encoded data was intercepted during transmission, the values that the musical notation represents would be unknown to the interceptor.

ASV generation by ASV generator 426 may be applied to live action, synthetic and augmented datasets to convert them into ASV representations for deep learning training, for example, of recognition deep learning algorithm 432 or computer vision processing by deep learning trained systems such as recognition deep learning algorithm 432. In some embodiments, ASV representation data may be decoded into motion data, for example, for deep learning training, for example, of recognition deep learning algorithm 432 or computer vision processing by deep learning trained systems such as recognition deep learning algorithm 432.

In some embodiments, ASV generator 426 may be configured to convert captured video clips directly into an ASV representation is a unique secure key. In some embodiments, an ASV representation may be derived from an HSV representation (as generated by HSV generator 424).

Figure 7B:
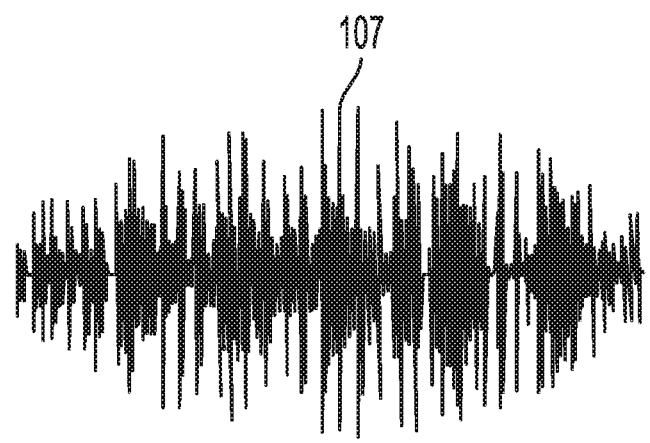
FIG. 7B depicts an Audio Saturation Value (ASV) representation of a human action, according to an embodiment.

FIG. 7B depicts an Audio Saturation Value (ASV) representation 107 of a human action, according to an embodiment. Audio Saturation Value (ASV) representation 107 depicts a person going through various states of falling. In the example illustrated in FIG. 7B, Audio Saturation Value (ASV) representation 107 is generated from HSV representation 106.

In some embodiments, ASV representation 107 is obtained by converting motion features into auditory values, and if the conversion key is known, HSV representation 106 and ASV representation 107 may be interchangeable and be converted back and forth.

In some embodiments, a video frame may be directly converted into an ASV representation without an intermediate motion feature extraction step by motion capturer 412.

Values in an ASV representation may be based on motion features, as well as identified high-risk profile events. For example, a catastrophic fall event, which may be represented by an extreme downward vector motion combined with a rapidly increasing velocity, may generate an ASV representation of an excitable and ominous audible experience whereas a minor stumble may generate an ASV representation of a less excitable and ominous audible experience.

In another example, to detect aggressive events in a patient's room, a motion such as a gentle handshake or pat on the back may generate an ASV representation of a pleasant-sounding audio experience whereas a dementia patient thrashing about and assaulting a healthcare worker may generate an ASV representation of an ominous auditory experience.

In some embodiments, an ASV representation may assist in the interpretation of an HSV representation.

In some embodiments, an ASV representation may improve a computer vision classifier into more granular alert determinations.

Figure 8A:
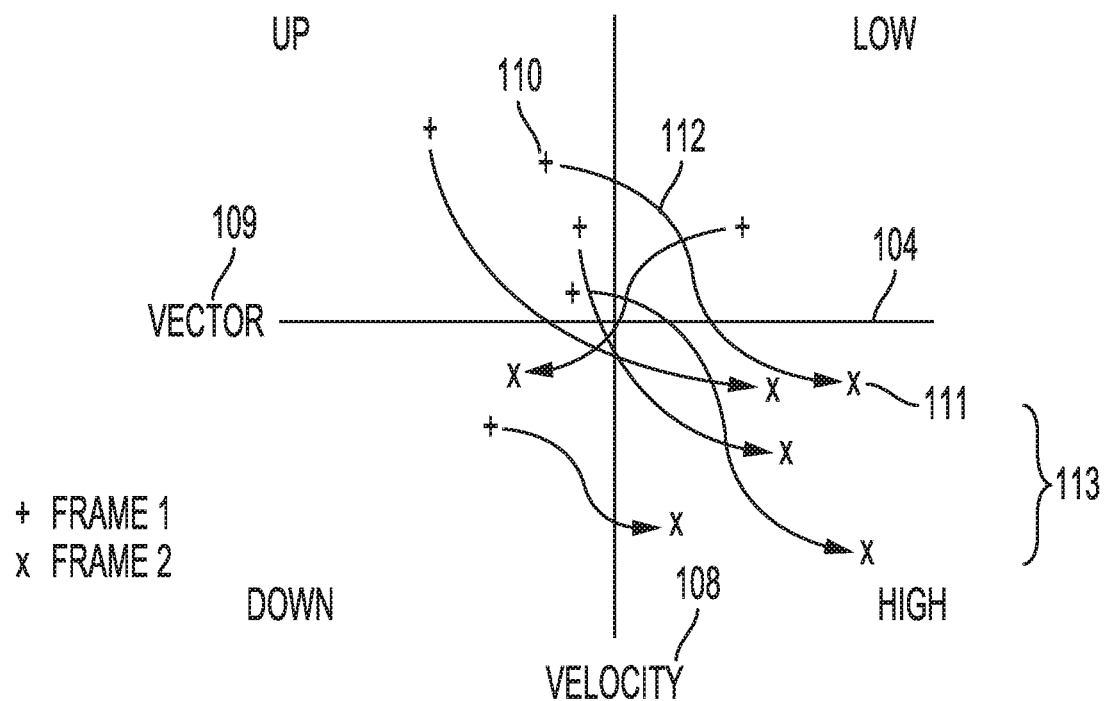
FIG. 8A depicts a plot of several pixels in two adjacent video frames, according to an embodiment.

FIG. 8A depicts a plot of several pixels in two adjacent video frames, Frame 1 and Frame 2. This plot may be generated, for example, by motion capturer 412. The symbols "+" 110 illustrated in FIG. 8 represent the position of pixels in Frame 1 and the symbols "x" 111 illustrated in FIG. 8 represent the position of those pixels in Frame 2.

Lines 112 originating from "+" 110 to "x" 11 represent the change in value from a pixel's resting state to its final state.

The motion of the pixels is pre-classified as a fall based on Velocity 108 and Vector 109, the Vector 109 be being plotted along the vertical plane from a down to an up position and Velocity 108 being plotted on the horizontal plane from low to high velocity. The quadrant bounded by high Velocity and down Vector movement 113 represents the highest-risk quadrant, as it relates to fall events.

Each pixel 111 may be assigned an identifier, pixel number 115, and a pixel value 116, as illustrated in an example in table 114 of FIG. 8B. Pixel value 116 may be then converted into musical notation.

FIG. 8B depicts table 114 in which pixel values 116 and musical characteristics (musical note 117, duration of note 118, tone value 119 and volume of note 120) have been assigned to each pixel identified by a pixel number 115, according to an embodiment.

In some embodiments, note tone 119 may provide for more or less treble and bass for a slight sharpening or flattening of the note, or for placement of the note higher or lower on the musical scale to further convey a positive or negative change in the status of the pixel 115.

Pixel 115 that transits from a higher risk quadrant 113 to a lower risk quadrant may have diminished values, especially in terms of volume, and therefore have a lower effect on the overall musical score.

Multiple notes may create a chord progression that conveys different attributes of the capture motion event.

Assignment of musical attributes to the pixel values 116 may be done by a composer versed in the art of creating music. In an example, music may be composed that heightens the senses of scenes similar to cinematic films that have "sinister" or catastrophic musical scores associated with specific events.

In some embodiments, a labeled dataset of clips of musical scores that depict tragic or sinister types of events may be used to train a deep learning model that would then be used to assign values to a pixel to achieve the desired result and accentuating motion feature representations with ASV representations.

In the case of other high-risk events, such as self-harm, aggression or fighting being detected a musical ASV scheme may be developed.

In some embodiments, instead of using visual identifiers to generate an ASV representation, audio recorded from an event could be used to detect and predict aggressive events that could lead to injuries to the patient or staff. In an example, a raw audio recording, per second or frame, may be converted in a scale based on attributes such as cadence, inflection, and volume or even machine recognized words/phrases (for example, aggressive words, foul language) related to established clinical findings, or through deep learning labelled datasets and the resulting musical score could be used as an alert, such as a ringtone, at reporting device 134.

Traditionally, healthcare workers may be extremely busy and they are besieged by a multitude of stock audio alarms from monitoring equipment. A healthcare worker may be notified of a situation through the in-house nurse call system or their smartphone, tablet, smartwatch, or pager using a stock vibration or ringtone. A generic auditory or vibration notification may force the healthcare worker to open up the app and review the alert and its associated video clip.

In some embodiments, an alert provided to a healthcare worker, for example, by way of reporting device 134, may correspond to an ASV representation of an event. As such, the ASV representation generated ringtone or vibration sequence may be unique for each alert and convey the severity of the alert. In some embodiments, the unique auditory alert may also indicate the actual room number where the incident is taking place, and be conveyed without the healthcare worker having to take the reporting device 134 out of their pocket.

The use of ASV representation as a type of ringtone may also be of value when using rather limited communication devices such as pagers that do not support video and/or smart watches which may have limited video capabilities due to bandwidth, processing power or screen resolution.

Data generated by ASV generator 426 may be stored in dataset storage 440.

In the development of impactful cinema films, the industry was forever changed when Alfred Hitchcock demonstrated that by adding a terror-inducing audio soundtrack that matched the severity of the terrible visual assault that took place in the film Psycho, it dramatically heightened the sensory response of the viewer. In the case of a healthcare scenario generated video clip, the HSV representation redaction process may remove background and specific personal health information type info for privacy and for the lowering of bandwidth/operating costs. Although the security and privacy benefits of HSV redaction may outweigh the loss of image clarity, the addition of the auditory clues through ASV representation process may provide additional intelligence on an event, for example, the severity of the descent phase of a six second fall event, based the observations that the computer can detect that would be otherwise missed by an untrained observer. Such auditory clues may include AI speech generated clues about the velocity, rotation and vector direction information and an estimated Patient Safety and Reporting (PSRS) score providing an estimated level of predicted harm ranging from (1) no injury/harm to (4) serious injury as well as a recommended course of action based on the severity of the event that can be based on the latest best healthcare practices available at that time.

Machine learning involves programming rules and code that can detect patterns and generate output data that represents predictions or forecasting. Deep learning techniques further use multiple internal layers of nonlinear processing to conduct supervised or unsupervised learning from data.

Recognition deep learning algorithm 432 may include deep learning architecture such as artificial neural networks.

At a training phase, motion features may be extracted from event data, and recognition deep learning algorithm 432 may train from datasets stored in dataset storage 440 to create deep learning models.

At a testing phase, deep learning models may be tested using datasets stored in dataset storage 440 to create deep learning models.

At an application or prediction phase, trained deep learning models may perform recognition, such as motion recognition, image recognition, and/or audio recognition, of recorded event data received at computing device 129, the results of which may be output to reporting device 134. Motion recognition may, for example, identify actions or attributes in the recorded event, such as a human fall.

In some embodiments, recognition deep learning algorithm 432 may be trained and perform computer vision processing.

Accurate recognition of specific attributes and events may be dependent on having a number of diverse instances in the training set, for example, audio and video data from different frame resolutions, viewpoints, lighting conditions, and background noise. Being trained on a diverse data set, for example, as generated by motion capturer 412, synthetic dataset generator 414, dataset augmenter 416, multimodality dataset generator 418, HSV generator 424, or ASV generator 426, may allow deep learning algorithms, in application, to discern between small and subtle differences. For example, the differences between a friendly wave and a threatening hand gesture, or the differences between an escalated human voice volume and intensity in a state of surprise as compared to anger may be very subtle. If subtle differences can be recognized, they can be used for detection and as a prediction of physical violence to follow.

Supplemental data analyzer 428 may be configured to correlate or validate datasets or prediction models generated by recognition deep learning algorithm 432.

In an example, individuals such as elders or patients, on admission to a healthcare facility, may be administered a fall risk test such as the Falls Risk Assessment (FRAT) test. The test may be used to determine patient risk for falling on a scale and contribute to patient placement decision in a healthcare facility.

Data from a FRAT test may be used by supplemental data analyzer 428 to validate prediction models or enhance the accuracy (for example, lower false positives and false negatives) of an HSV or ASV representation, for example, by giving more weight to recognized potential fall events where the individual's ranking on the FRAT scale is higher.

In some embodiments, individuals may be assessed for difficulty in transferring their weight from a sitting position to a standing position, stability of their gait (symmetrical vs. asymmetrical), time taken to leave the area of the bed, and time to transit to the washroom and back. These assessments may be performed using a scale similar to a Timed Up and Go (TUG) test. Published research shows that conditions, as described above, can be a clear indication of a person's walking stability and has a direct correlation to subsequent falls that day or the specific event that is being analyzed herein. This supplemental data may similarly be used by supplemental data analyzer 428 to verify or validate data processed in computing device 120.

Alert generator 430 is configured to generate alerts, for example, based on an HSV representation, an ASV representation, or a prediction of recognition deep learning algorithm 432. Alerts generated by alert generator 430 may be transmitted to reporting device 134, for example, for display on a mobile device.

Alerts may be processed in real-time or near real-time.

In terms of real-time alerts, based on computer vision and audio processing, for safety purposes, there is a tendency to make systems more sensitive than less. This is also further complicated if the training dataset has not provided enough viable instances of certain attributes, which may be addressed by larger and more diverse datasets, as described herein. Over-sensitive systems or insufficient datasets may result in false positives being generated and displayed or communicated in various electronic ways. There are some scenarios where these alerts would be of low volume and non-critical in nature and every alert will be promptly followed up. In the case of healthcare scenarios, where there is a low professional staff/patient ratio, a high occurrence of false positives, or a low Positive Prediction Score (PVV) may lead to such a system being totally ignored, rendering the entire system useless. The large and diverse datasets, as described herein, may address these issues and result in more accurate alerts being generated.

Figure 9:
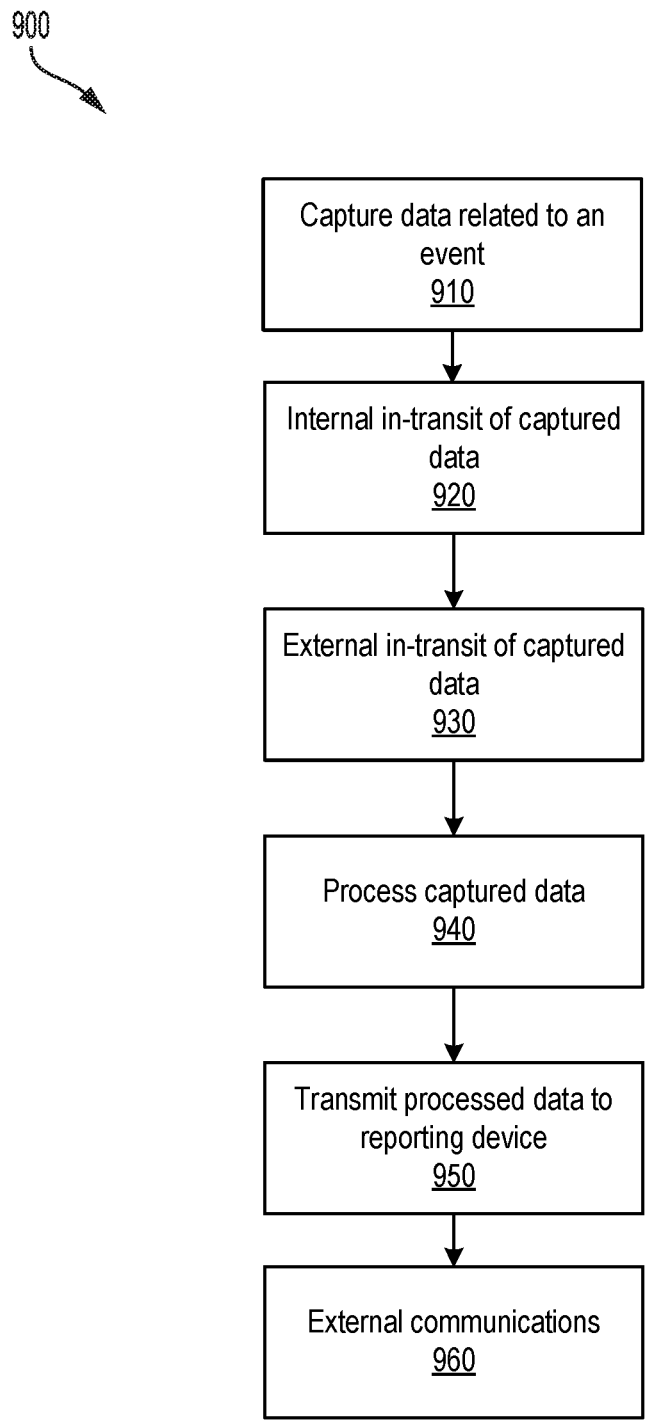
FIG. 9 is a flow chart of a processing pipeline of the recognition system of FIG. 1.

FIG. 9 is a flow chart of a processing pipeline 900 of recognition system 100.

At block 910 data of an event is captured or recorded at capture device 122. In some embodiments, motion may be detected by a sensing or detection device to trigger the start of recording of the event.

At block 920 captured data may be transmitted by internal in-transit of captured data from capture device 122 to switch/router 125.

At block 930, external in-transit transmits captured data from switch/router 125 to computing device 129.

At block 940, captured data is processed at computing device 129, for example, as outlined in FIGS. 10 and 11, described below.

At block 950, computing device 129 transmits processed data such as recognition data, HSV data, ASV data, and alert data from computing device 129 to reporting device 134.

At block 960, external communications, such as alerts generated at computing device 129, are sent to reporting device 134.

In some embodiments, some or all of the steps in processing pipeline 900 may be performed in any of capture device 122, computing device 129, or reporting device 134.

Figure 10:
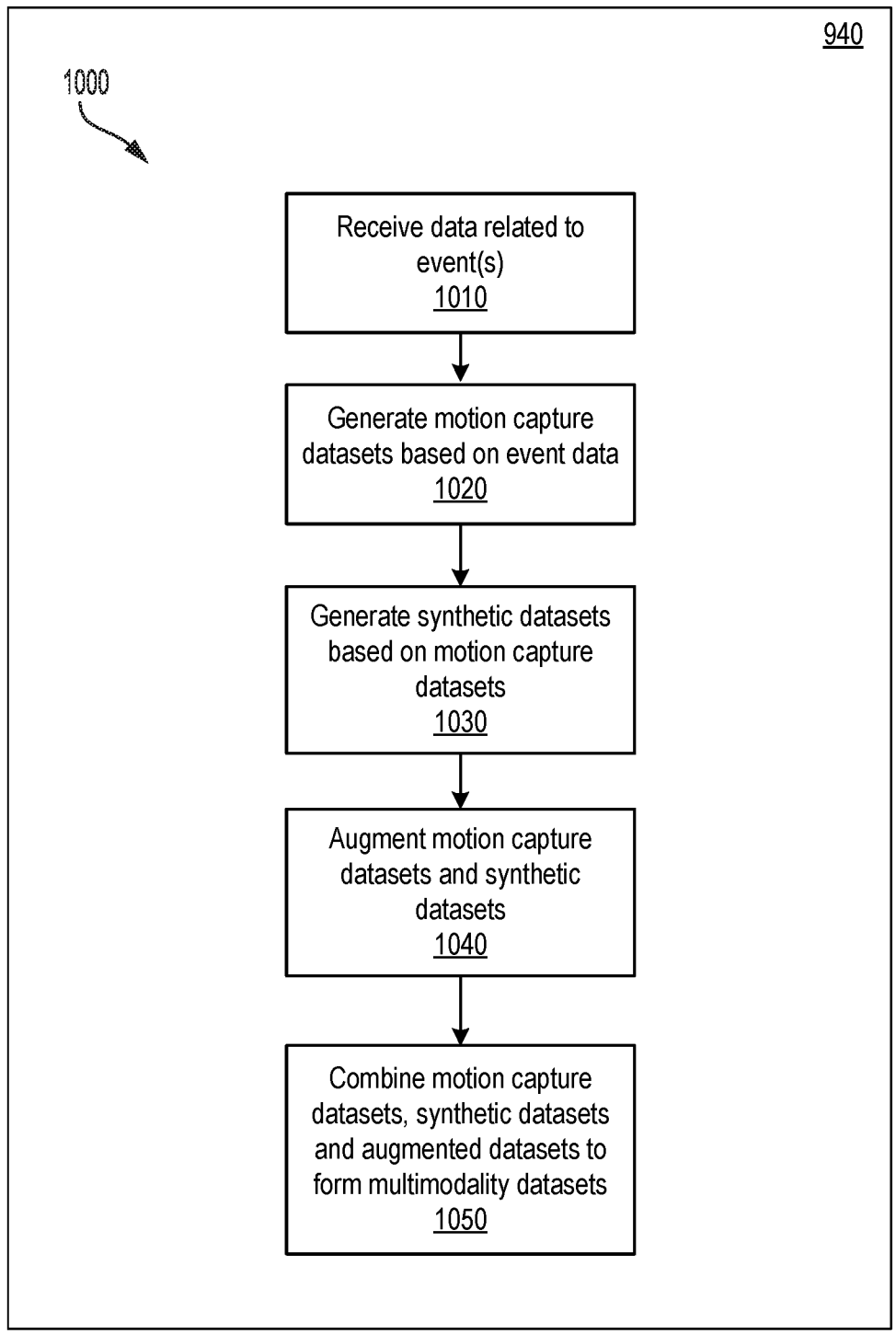
FIG. 10 is an expanded view of a method for processing captured data, in accordance with an embodiment.

FIG. 10 is an expanded view of a method 1000 for processing captured data 940, in accordance with an embodiment. In method 1000, captured or recorded data may be processed to form a large and diverse number of datasets, which may be used to train a deep learning algorithm such as recognition deep learning algorithm 432. Blocks 1010 to 1050 may be performed by processor(s) 310 executing the software of FIG. 4.

At block 1010, data is received at computing device 129 relating to event(s), for example, a video recording of an event captured by capture device 122.

At block 1020, motion capturer 412 generates motion capture datasets based on the event data.

At block 1030, synthetic dataset generator 414 generates synthetic datasets based on the motion capture datasets.

At block 1040, dataset augmenter 416 augments motion capture datasets and synthetic datasets.

At block 1050, multimodality dataset generator 418 combines motion capture datasets, synthetic datasets and augmented datasets to for multimodality datasets.

The generated datasets may represent the many types of sensitive low-occurring aberrant behaviors and actions that are specific to what is critical to be monitored in a vertical market scenario. As such, advances in deep learning training techniques may be taken advantage of.

In some embodiments, processing captured data 940 involves training, testing, and application of recognition deep learning algorithm 432. In application, recognition deep learning algorithm may output a prediction for event data, for example, that a fall has occurred. An alert may then be generated, for transmission to reporting device 134.

Those skilled in the art will appreciate that the techniques, logic, and process steps illustrated in the various flow diagrams discussed above, may be altered in a variety of ways to meet specific use cases. For example, the order of the logic steps may be rearranged, substeps may be performed in parallel, illustrated logic may be omitted, and other logic may be included. One will recognize that some steps may be consolidated into a single step and that actions represented by a single step may be alternatively represented as a collection of sub-steps.

Large and diverse datasets, including multimodality datasets, may improve the performance of artificial intelligence (AI) pipelines by reducing the cost of producing, operating and securing effective machine learning systems in healthcare domains and other fields.

Predictions generated by a deep learning algorithm from a multimodality dataset may have a major impact in improving public, student, patient and elderly safety.

Larger action recognition training sets may train computer vision systems to have the potential to recognize not only high-risk events, and may also recognize pre-cursor events that could lead to catastrophic events that are about to unfold and provide crucial alerts to allow staff to take preventive measures. In an academic research setting, there is generally more time and computing resources to tackle one action recognition activity at a time in a linear fashion. In a commercial setting, to be a viable, a vendor may need to find ways to quickly build cost-effectively custom datasets, as described herein, for specific low occurring activities, that will provide consistent and reliable results based on a high sensitivity and specificity rankings.

The techniques described herein for synthetic rendering to generate a variety camera angles/vantage points may allow for "future proofing" a computer vision system. Many current computer vision models, except for those that use the current expensive and limited depth cameras, are based on 2D models as this dramatically reduces machine learning processing time plus this what the majority of commercial video cameras in the marketplace support. When machine learning algorithms based on GPU, TPU or quantum computing based processing systems in advance in the future, the existing collected and redacted 2D dataset may be repurposed into 3D volumetric datasets, as it was originally created in 3D with multiple capture devices covering the subject from multiple angles, to create machine learning algorithms to support the next generation of low cost depth video cameras with having to recapture or re-shoot the original motion captured scenes.

A use case for recognition system 100 includes autonomous vehicles. A larger dataset of captured driving conditions may be useful to create predictions allowing a vehicle to provide warning and take evasive maneuvers in dangerous conditions. For example, a condition may not have been previously encountered by an autonomous driving system, such as a white transport trailer against a white sky. In such conditions, the system may provide a warning or alert. However, with a larger dataset, generated as described herein, such conditions could be generated using synthesis or augmentation, and that data used to train the autonomous driving system, which may result in better prediction and prompt the vehicle to not only provide a warning but to also take evasive maneuvers.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented method for generating a multimodality dataset, comprising:
   extracting motion features from a video recording of a real-world event, captured from a video recording device, to generate a motion capture dataset, the motion capture dataset including human models of human motion;
   generating a synthetic dataset based on derivatives of the motion capture dataset;
   converting the synthetic dataset to a heatmap of vectors and velocities of human actions and inanimate object movements;
   generating an augmented motion capture dataset based on modified conditions of the motion capture dataset;
   generating an augmented synthetic dataset based on modified conditions of the synthetic dataset; and
   generating a multimodality dataset based on a combination of the motion capture dataset, the synthetic dataset, the augmented motion capture dataset, and the augmented synthetic dataset.

2. The computer-implemented method of claim 1, wherein the derivatives include at least one of shape, height and sex of the human models.

3. The computer-implemented method of claim 1, wherein the modified conditions include at least one of orientation, location, scale and brightness.

4. The computer-implemented method of claim 1, further comprising: filtering and rendering at least one of the motion capture dataset, the synthetic dataset, the augmented motion capture dataset, or the augmented synthetic dataset to form a colourized heatmap representing vectors and velocities.

5. The computer-implemented method of claim 4, wherein the colourized heatmap is a hue saturation value representation.

6. The computer-implemented method of claim 4, wherein the vectors and velocities represent vectors and velocities of human actions and inanimate object movements.

7. The computer-implemented method of claim 1, further comprising converting at least one of the motion capture dataset, the synthetic dataset, the augmented motion capture dataset, or the augmented synthetic dataset into a music or sound notation to form an audio saturation value representation.

8. The computer-implemented method of claim 1, wherein the real-world event is simulated.

9. The computer-implemented method of claim 1, wherein the multimodality dataset is for use in training a machine learning algorithm.

10. The computer-implemented method of claim 9, wherein the machine learning algorithm is a motion recognition deep learning algorithm for predicting actions based on a video input.

11. A computer system comprising:
   a processor;
   a memory in communication with the processor, the memory storing instructions that, when executed by the processor cause the processor to:
      extract motion features from a video recording of a real-world event, captured from a video recording device, to generate a motion capture dataset, the motion capture dataset including human models of human motion;
      generate a synthetic dataset based on derivatives of the motion capture dataset;
      convert the synthetic dataset to a heatmap of vectors and velocities of human actions and inanimate object movements;
      generate an augmented motion capture dataset based on modified conditions of the motion capture dataset;
      generate an augmented synthetic dataset based on modified conditions of the synthetic dataset; and
      generate a multimodality dataset based on a combination of the motion capture dataset, the synthetic dataset, the augmented motion capture dataset, and the augmented synthetic dataset.

12. The computer system as claimed in claim 11, wherein the processor is configured to:
  filter and render at least one of the motion capture dataset, the synthetic dataset, the augmented motion capture dataset, or the augmented synthetic dataset to form a colourized heatmap representing vectors and velocities.

13. The computer system as claimed in claim 12, wherein at least one of:
  the colourized heatmap is a hue saturation value representation; or
  the vectors and velocities represent vectors and velocities of human actions and inanimate object movements.

14. The computer system as claimed in claim 11, wherein the processor is configured to:
  convert at least one of the motion capture dataset, the synthetic dataset, the augmented motion capture dataset, or the augmented synthetic dataset into a dynamic music or sound notation to form an audio saturation value representation that is determined from a deep learning trained algorithm.

15. The computer system as claimed in claim 11, wherein the multimodality dataset is for use in training a motion recognition deep learning algorithm for predicting actions based on a video input or other passive or active proximity detection recording device.

16. An electronic device for machine learning motion recognition, comprising a processor and memory storing code to configure the processor to:
  at a training phase,
    extract motion features from event data to generate a motion capture dataset;
    generate a synthetic dataset based on the motion capture dataset;
    convert the synthetic dataset to a heatmap of vectors and velocities of human actions and inanimate object movements;
    generate an augmented fully redacted multimodality dataset based on a combination of the motion capture dataset and the synthetic dataset;
    using deep learning, build a recognition model using the generated datasets;
  at a prediction phase,
    receive features of additional event data;
    process the features using the recognition models to generate predicted motion data;
    generate alert data based on the generated predicted motion data; and
    transmit the alert data to a reporting device.

17. The electronic device of claim 16, wherein the processor is further configured to:
  convert the motion capture dataset to a heatmap of vectors and velocities of human actions and inanimate object movements.

18. The electronic device as claimed in claim 16, wherein the processor is configured to:
  at least one of:
    filter and render at least one of the motion capture dataset, the synthetic dataset, the augmented motion capture dataset, or the augmented synthetic dataset to form a colourized heatmap representing vectors and velocities; or
    convert at least one of the motion capture dataset, the synthetic dataset, the augmented motion capture dataset, or the augmented synthetic dataset into a dynamic music or sound notation to form an audio saturation value representation that is determined from a deep learning trained algorithm.

19. The electronic device as claimed in claim 18, wherein at least one of:
  the colourized heatmap is a hue saturation value representation; or
  the vectors and velocities represent vectors and velocities of human actions and inanimate object movements.

20. The electronic device as claimed in claim 16, wherein the multimodality dataset is for use in training a motion recognition deep learning algorithm for predicting actions based on a video input or other passive or active proximity detection recording device.

\* \* \* \* \*